E. W. WRAY.
AUTOMATIC SCALE.
APPLICATION FILED JULY 19, 1906.
910,627.
Patented Jan. 26, 1909.
2 SHEETS—SHEET 1.
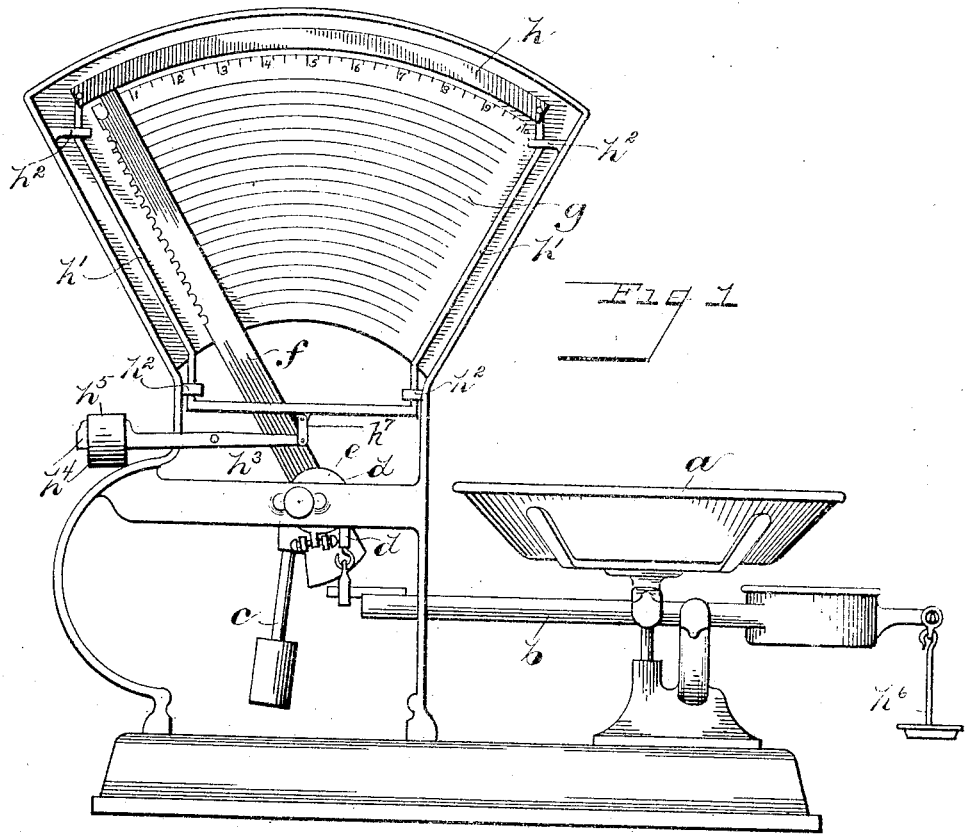
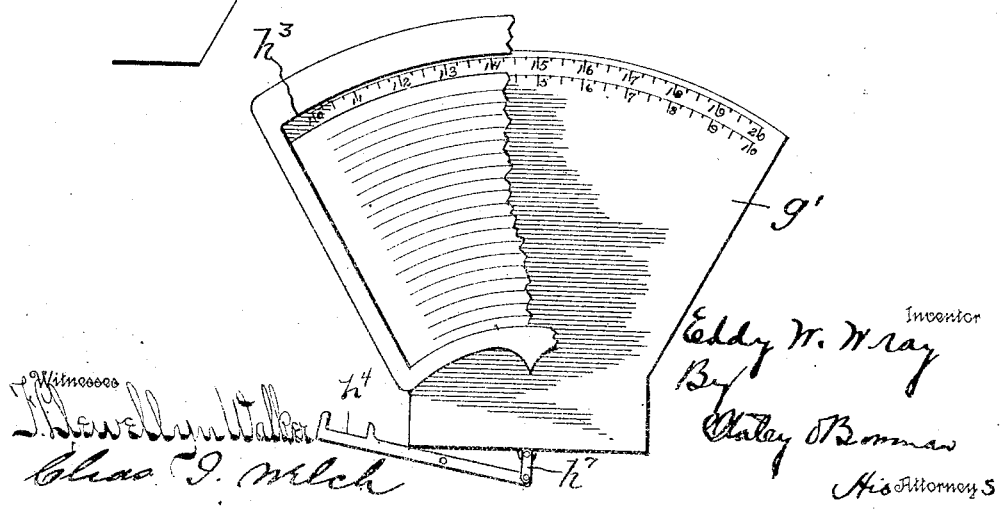

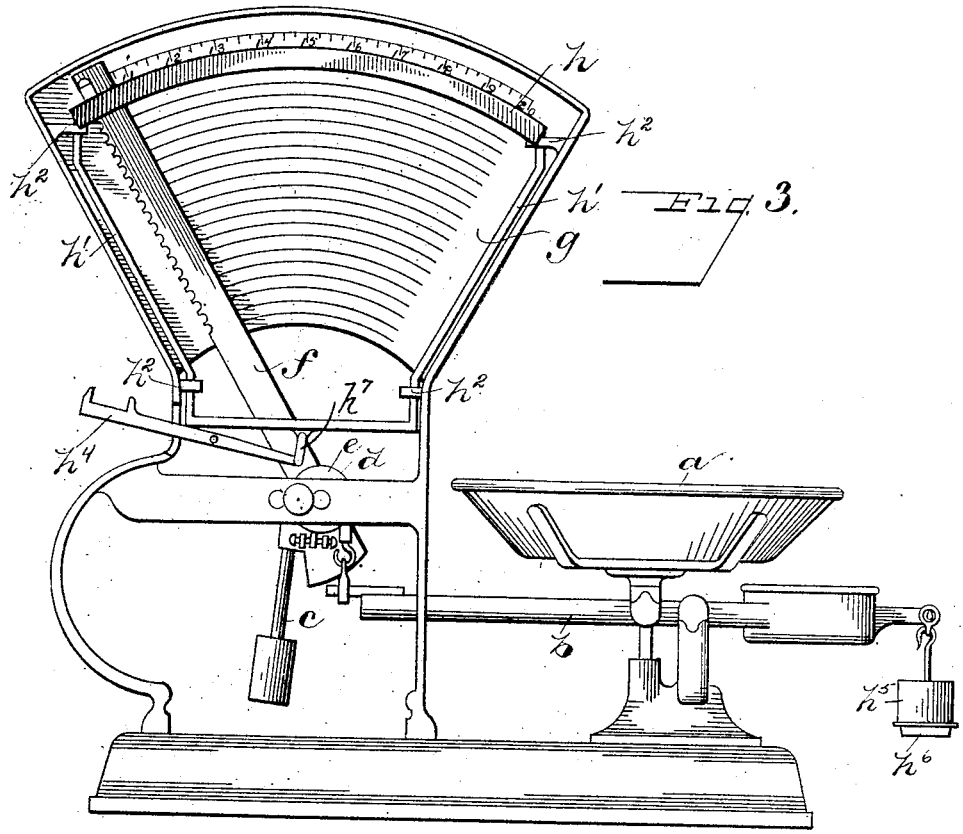
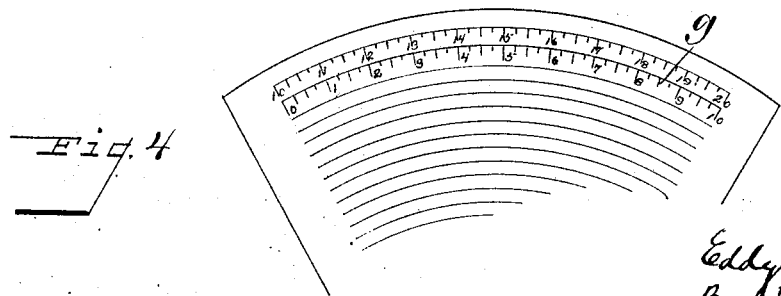

UNITED STATES PATENT OFFICE.

EDDY W. WRAY, OF CHICAGO, ILLINOIS.

AUTOMATIC SCALE.

No. 910,627.　　　Specification of Letters Patent.　　　Patented Jan. 26, 1909.

Application filed July 19, 1906. Serial No. 326,928.

*To all whom it may concern:*

Be it known that I, EDDY W. WRAY, a citizen of the United States, residing at Chicago, in the county of Cook and State of Illinois, have invented certain new and useful Improvements in Automatic Scales, of which the following is a specification.

My invention relates to improvements in scales, and particularly to that class of scales known as automatic scales, in which the capacity of the scale is increased by the addition of a constant weight.

The object of the invention is to provide means by which mistakes are prevented in the reading of the figures when the weight is on or off.

In scales of this type, particularly in those automatic scales of the pendulum type, it has been common to employ an additional weight to increase the capacity of the scale, and the use or non-use of the weight requires the reading of a different set of figures, and to avoid mistakes these are sometimes printed in different colors. Even with this, however, mistakes frequently occur, owing to the operator failing to note whether the weight is or is not in the proper position. By my invention, I provide means by which when the weight is removed from the weighing transaction it is utilized to operate the indicating mechanism in such manner that only the proper figures can be read.

In the accompanying drawings, Figure 1 is a front elevation of a scale of the pendulum type to which my invention has been applied. Fig. 2 is a view of part of the indicating mechanism showing a modification. Fig. 3 is a view similar to Fig. 1, showing the indicating device in different positions. Fig. 4 is a detail view of the indicating chart.

Like parts are represented by similar letters of reference in the several views.

In the said drawings, $a$ represents the pan or goods-receiver.

$b$ is the main lever.

$c$ is a weighted pendulum which is connected to the lever, preferably by means of a strap, $d$, operating over a cam $e$. This cam, $e$, also carries an indicating-hand, $f$, which is adapted to pass over the chart, $g$, a distance proportionate to the weight on the receiver $a$. A scale of this character has a certain capacity depending upon the leverage and the weight on the pendulum $c$. To increase the capacity a weight is sometimes applied. In the present scale I have shown the weighing capacity of the scale without the weight as being ten pounds, the addition of the weight being adapted to double the capacity or make it twenty pounds. To provide for exposing only the proper indication, depending on whether the weight is in use or not, I construct the indicating mechanism with a movable part adapted to be moved in such way that only one series of indications will be visible at the same time. This is accomplished, as shown in Fig. 1, by means of a guard or shield, $h$, supported on a frame, $h^1$, which is movable in suitable supports, $h^2$, and attached to a lever, $h^3$, which has a weight-receiver $h^4$. The removable weight is shown on this weight receiver at $h^5$, a suitable weight-receiver, $h^6$, being attached to the main lever, $b$, to act as a counter-poise. So long as the weight, $h^5$, is on the weight-receiver, $h^4$, the guard, $h$, will be elevated and kept over that series of figures from 10 to 20 which indicate the amounts determined when the weight is used as a counterpoise on the receiver, $h^6$, leaving in view only the figures from 1 to 10. When the weight is applied to increase the capacity of the scale, it will be removed from the shield-holding device and the shield will drop down and expose the upper series of figures and cover the lower series of figures, so that it will be impossible to read the wrong series. It will be understood that the same weight, $h^5$, is used in both cases, and when the weight is removed as a counterpoise for the weighing operation it is placed on the weight receiver and operates to adjust the indicating mechanism to the proper position; when it is moved from the weight receiver and used as a counterpoise for the weighing, the indicating mechanism is again automatically adjusted to the new condition.

In Fig. 2 I have shown the same result accomplished by having the figures on the movable part instead of on the stationary part, this movable part, $g^1$, is in the nature of a supplemental dial or chart having a plurality of series of figures adapted to be displayed through an opening, $h^3$, in the stationary dial which in this case performs the function of the screen this arrangement being practically a reversal of that shown in Fig. 1, in Fig. 1 the screen being movable and the chart with the plurality of figures being stationary and in Fig. 2 the screen being stationary and the chart with the plurality of figures being movable. When the weight, $h^5$, is used with the weight receiver, $h^6$, it is, of course, constant and when the device is used as a computing scale it requires the addition of a constant amount to the amount shown on the chart to each price per pound in a well known manner. It is obvious the same arrangement might be used in combination with a weight on the pendulum, $c$, in which case the computing chart would be shifted as in the regular way so that only such series of figures as would correspond with the one set of price figures could be read; the weight when removed from the pendulum being adapted to operate the indicating mechanism in such way that only one series of figures would show as in the first mentioned arrangement.

Having thus described my invention, I claim:

1. In an automatic scale, a single indicating device including a dial with a plurality of series of figures thereon, one of said series being normally concealed, a counterpoise weight, and a receiver therefor, a supplemental receiver for said counterpoise, and means connected with said last-mentioned receiver for simultaneously displaying a different series of figures upon the removal of the weight from said supplemental receiver, substantially as specified.

2. In an automatic scale, an indicating device formed with two parts one stationary and the other movable, one of said parts having a plurality of sets of figures all but one of said sets being hidden by the other part, a removable weight, a weight receiver for the same, an additional weight receiver attached to the movable part of said indicating device and adapted by its weight to hold said movable part in a certain position and thus bring a certain set of figures into view, as and for the purpose specified.

3. In a scale having an indicating hand and a two-part indicating device, one of said parts having a plurality of sets of figures adapted to operate in connection with said hand, all but one of said sets of figures being hidden by the other part, a counter-poise adapted to move distances corresponding to the weight on the scale, a movable weight for changing the capacity of said scale, and a weight receiver adapted to receive said weight when not in use as a counter-poise, and a connection from said weight receiver to the movable part of said indicating device to bring the movable portion of said indicating device into a different position and expose a different set of figures.

4. In combination with the main lever, a goods receiver thereon, a pendulum, and a connection from said main lever to said pendulum, an indicating hand, a removable counter-poise weight adapted to change the capacity of said scale, and an indicating device having indicating figures thereon and including a movable part coöperating therewith, the movable part being adapted to be operated by said weight to cover up certain of said indicating figures and disclose others depending on the position of the weight, substantially as specified.

5. In an automatic pendulum scale, a counterpoise weight receiver and a movable weight normally thereon, a single indicating device including a dial with a plurality of series of figures thereon, a movable part coöperating with said dial to expose one series of figures at a time, an additional weight receiver forming part of the scale, and means connected with said receiver and said movable part for exposing a different series of figures upon the removal of the counterpoise from the first-mentioned weight receiver to the second-mentioned weight receiver, substantially as and for the purpose specified.

In testimony whereof, I have hereunto set my hand this 12th day of July A. D. 1906.

EDDY W. WRAY.

Witnesses:
ORVAL GEORGE WHITE,
CHAS. EUGENE SHOMO.